(12) United States Patent
Davis et al.

(10) Patent No.: US 8,251,400 B2
(45) Date of Patent: Aug. 28, 2012

(54) RESTRAINT SYSTEM FOR A TRANSPORTATION VEHICLE

(75) Inventors: Phillip J. Davis, Crawfordsville, IN (US); Brian Hood, Zionsville, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 198 days.

(21) Appl. No.: 12/602,977

(22) PCT Filed: Jun. 13, 2008

(86) PCT No.: PCT/US2008/066903
§ 371 (c)(1),
(2), (4) Date: Apr. 7, 2010

(87) PCT Pub. No.: WO2008/157344
PCT Pub. Date: Dec. 24, 2008

(65) Prior Publication Data
US 2010/0231024 A1    Sep. 16, 2010

Related U.S. Application Data

(60) Provisional application No. 60/934,410, filed on Jun. 13, 2007.

(51) Int. Cl.
*B60R 21/13* (2006.01)
(52) U.S. Cl. .......................... 280/756; 280/807; 280/808
(58) Field of Classification Search .................. 280/807, 280/756; 297/253
See application file for complete search history.

(56) References Cited

U.S. PATENT DOCUMENTS

| | | | | |
|---|---|---|---|---|
| 4,919,488 A | * | 4/1990 | Deegener et al. | 297/468 |
| 5,746,476 A | * | 5/1998 | Novak et al. | 297/216.13 |
| 6,109,697 A | | 8/2000 | Lane, Jr. et al. | |
| 7,488,038 B2 | * | 2/2009 | Boyle et al. | 297/255 |
| 7,770,969 B2 | * | 8/2010 | Boyle et al. | 297/254 |
| 7,784,867 B2 | * | 8/2010 | Lamparter | 297/233 |
| 7,896,434 B2 | * | 3/2011 | Lamparter et al. | 297/216.13 |
| 7,954,901 B2 | * | 6/2011 | Foye et al. | 297/473 |
| 2003/0025380 A1 | | 2/2003 | Vits et al. | |
| 2007/0001495 A1 | | 1/2007 | Boyle et al. | |

OTHER PUBLICATIONS

PCT International Search Report for PCT/US2008/069903 completed by the US Searching Authority on Sep. 4, 2008.

* cited by examiner

*Primary Examiner* — Toan To
(74) *Attorney, Agent, or Firm* — Barnes & Thornburg LLP (57) ABSTRACT

A restraint system for a transportation vehicle may comprise a restraint member movably mounted to the vehicle. The restraint member may have a first leg and a second leg that travel together along opposite sides of a seat carried by the vehicle as the restraint member moves relative to the vehicle. A restraint harness may include a retractor that may be mounted to one of the first and second legs, and a lap web having one end mounted within the first retractor and an opposite end mounted to the other of the first and second legs. The lap web may be configured to restrain an occupant of the seat when the restraint member is moved to an occupant restraint position. At least one lock may be mounted to the vehicle and configured to secure the restraint member to the vehicle when the restraint member is in the occupant restraint position.

18 Claims, 10 Drawing Sheets

FIG. 10

RESTRAINT SYSTEM FOR A TRANSPORTATION VEHICLE

CROSS REFERENCE TO RELATED APPLICATIONS

This application is a U.S. national counterpart application of international application serial No. PCT/US2008/066903 filed Jun. 13, 2008, which claims priority to U.S. Provisional Patent Application Ser. No. 60/934,410, filed Jun. 13, 2007. The entire disclosure of PCT/US2008/066903 and U.S. Ser. No. 60/934,410 are hereby incorporated by reference.

FIELD OF THE INVENTION

The present invention relates generally to restraint systems, and more specifically to restraint systems configured to restrain at least one occupant in an occupant transportation vehicle.

BACKGROUND

Various types of restraint systems for restraining occupants in occupant transportation vehicles are generally known. It is, however, desirable to provide for improved restraint systems for restraining at least one occupant in an occupant transportation vehicle.

SUMMARY

The present invention may comprise one or more of the features recited in the attached claims, and/or one or more of the following features and combinations thereof. A restraint system for an occupant transportation vehicle may comprise a restraint member movably mounted to the vehicle, a restraint harness and at least one lock. The restraint member may have a first leg and a second leg spaced apart from the first leg. The first and second legs may be configured to travel together along opposite sides of a seat carried by the vehicle as the restraint member moves relative to the vehicle. The restraint harness may comprise a first retractor mounted to one of the first and second legs of the restraint member, and a lap web having one end mounted within the first retractor and an opposite end mounted to the other of the first and second legs. The lap web may be configured to restrain an occupant of the seat when the restraint member is moved to an occupant restraint position. The at least one lock may be configured to secure the restraint member to the vehicle when the restraint member is in the occupant restraint position.

The restraint harness may further comprise a second retractor mounted to the other of the first and second legs of the restraint member. The other end of the lap web may be mounted within the second retractor.

The restraint system in either such embodiment may further comprise a third retractor mounted within the vehicle adjacent to one side of the seat. The restraint harness may further comprise a first shoulder web having one end mounted within the third retractor and an opposite end mounted to one of the first and second legs. The first shoulder web may be configured to extend over one shoulder of the occupant of the seat, and to restrain the occupant of the seat, when the restraint member is in the occupant restraint position. The restraint system may further comprise a web guide mounted within the vehicle. The first shoulder web may extend through the web guide between the third retractor and the opposite end of the first shoulder web. The restraint system may further comprise a fourth retractor mounted within the vehicle adjacent to an opposite side of the seat. The restraint harness may further comprise a second shoulder web having one end mounted within the fourth retractor and an opposite end mounted to the other of the first and second legs. The second shoulder web may be configured to extend over an opposite shoulder of the occupant of the seat, and to restrain the occupant of the seat, when the restraint member is in the occupant restraint position. In this embodiment, the restraint system may further comprise first and second web guides mounted within the vehicle. The first shoulder web may extend through the first web guide between the third retractor and the opposite end of the first shoulder web. The second shoulder web may extend through the second web guide between the fourth retractor and the opposite end of the second shoulder web.

Alternatively, the restraint system in either such embodiment may further comprise a third retractor mounted within the vehicle adjacent to one side of the seat. The restraint harness may further comprise a first shoulder web having one end mounted within the third retractor and an opposite end affixed to the lap web between the first and second legs. The first shoulder web may be configured to extend over one shoulder of the occupant of the seat, and to restrain the occupant of the seat, when the restraint member is in the occupant restraint position. The restraint system may further comprise a web guide mounted within the vehicle. The first shoulder web may extend through the web guide between the third retractor and the opposite end of the first shoulder web. The restraint system may further comprise a fourth retractor mounted within the vehicle adjacent to an opposite side of the seat. The restraint harness may further comprise a second shoulder web having one end mounted within the fourth retractor and an opposite end affixed to the lap web between the first and second legs. The second shoulder web may be configured to extend over an opposite shoulder of the occupant of the seat, and to restrain the occupant of the seat, when the restraint member is in the occupant restraint position. In this embodiment, the restraint system may further comprise first and second web guides mounted within the vehicle. The first shoulder web may extend through the first web guide between the third retractor and the opposite end of the first shoulder web. The second shoulder web may extend through the second web guide between the fourth retractor and the opposite end of the second shoulder web.

The restraint member may be pivotably mounted to the vehicle.

The restraint member may comprise a cross member having one end affixed to the first leg and an opposite end affixed to the second leg. The first and second legs may each have one end pivotably mounted to the vehicle and an opposite end. The cross member may be affixed to the first and second legs near the one ends thereof.

The vehicle seat may comprise a seat bottom mounted to the vehicle and a seat back extending upwardly away from the seat bottom. The restraint member may be movable relative to the vehicle between a pre-deployed position above the seat back such that an occupant may be seated in the seat without being impeded by the restraint member, and the occupant restraint position in which the first retractor is below a plane defined by a seating surface of the seat bottom such that the lap web contacts the occupant seated in the seat as the restraint member is being moved from the pre-deployed position to the occupant restraint position, and such that the first retractor pays out additional lap web after the lap web contacts the occupant when moving the restraint member to the occupant restraint position.

The at least one lock may comprise at least one actuator that is responsive to a control signal to control the at least one lock to a locked position in which the restraint member is secured to the vehicle. The restraint system may further comprise a control circuit configured to produce the control signal based on a signal received from at least one of a manually activated switch, a seat pressure switch, a parking brake, an ignition system of the vehicle, a vehicle speed sensor and a transmission gear selector.

One end of the first leg may be pivotably mounted to the vehicle and the first retractor may be mounted at or near an opposite end of the first leg. One end of the second leg may be pivotably mounted to the vehicle and the second retractor may be mounted at or near an opposite end of the second leg.

The first leg of the restraint member may be parallel to the second leg of the restraint member, and the first and second legs may remain parallel relative to each other throughout movement of the restraint member relative to the vehicle. The first leg and the second leg may have equal lengths.

In some embodiments, the at least one lock may comprise at least one of a sensor and a switch that produces a lock signal when the at least one lock is in a locked position in which the restraint member is secured to the vehicle. The restraint system may further comprise a control circuit that is configured to disable operation of at least one operational feature of the vehicle unless the at least one of the sensor and the switch is producing the lock signal.

The at least one operational feature of the vehicle may include at least one of an ignition system of the vehicle and a transmission gear selector.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
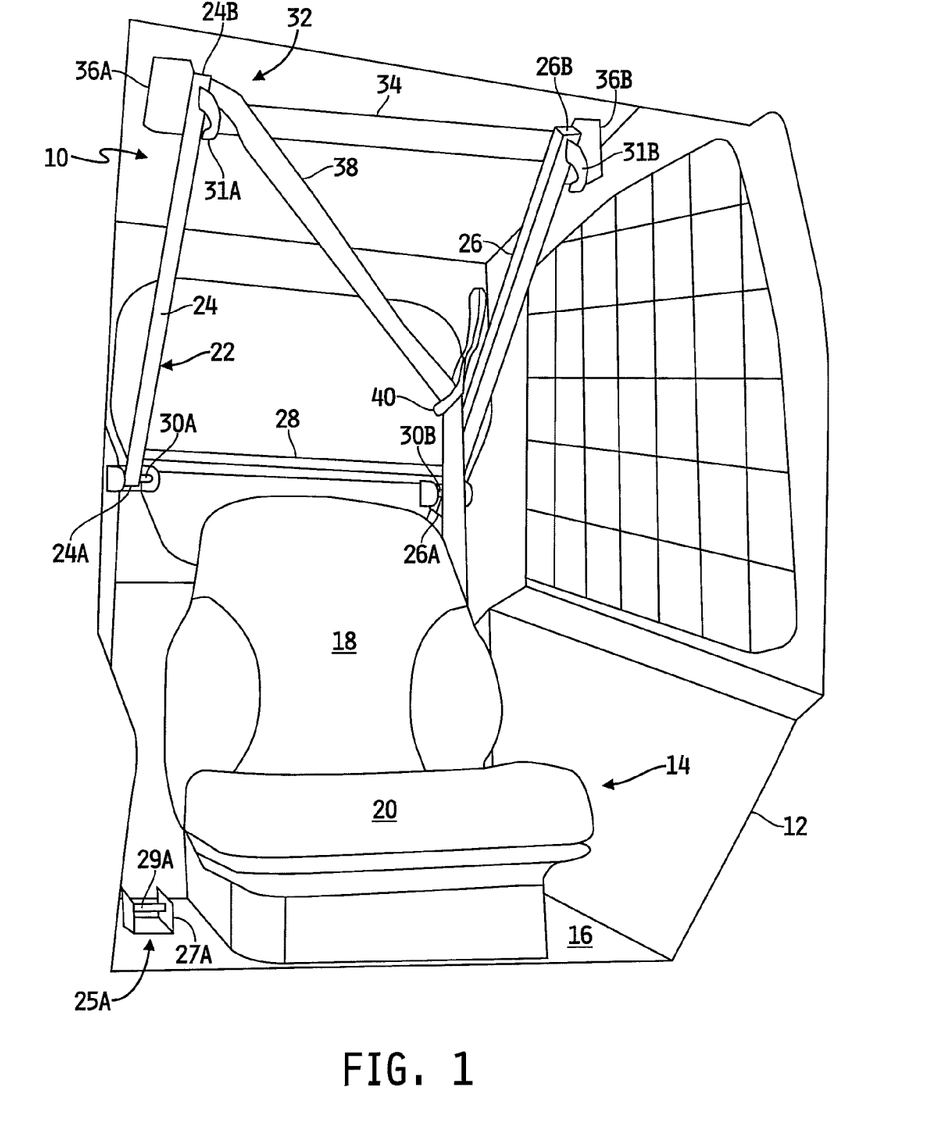
FIG. 1 is a diagram of one illustrative embodiment of a restraint system for a transportation vehicle, shown in a pre-deployed position.
Figure 2:
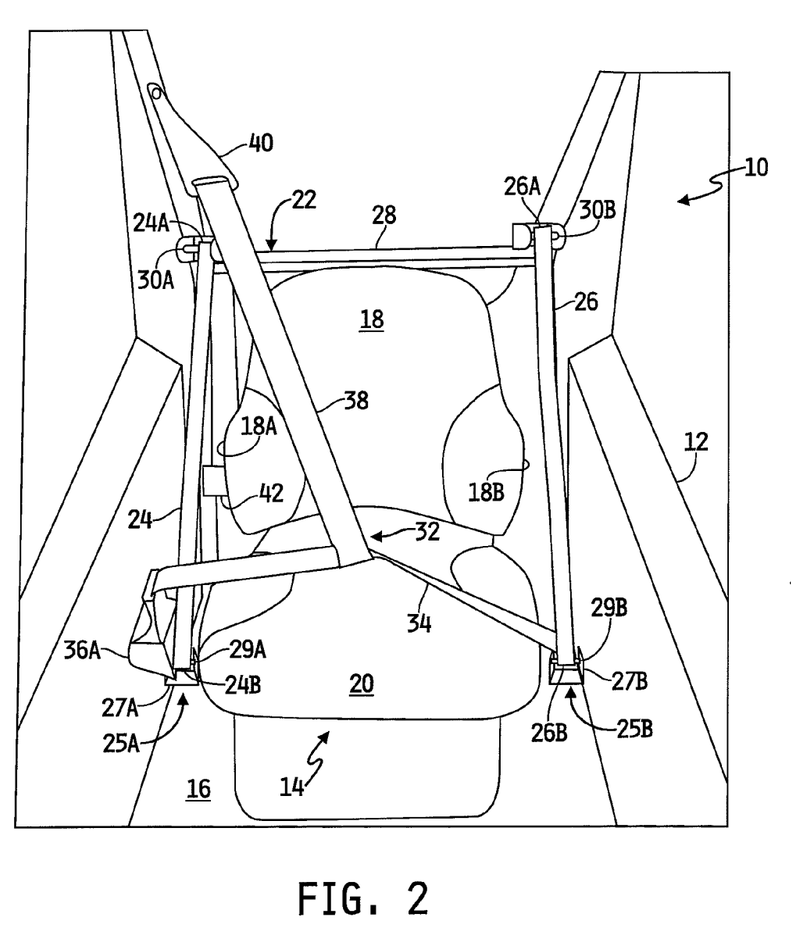
FIG. 2 is a diagram of the restraint system of FIG. 1 shown in an occupant restraint position.
Figure 3:
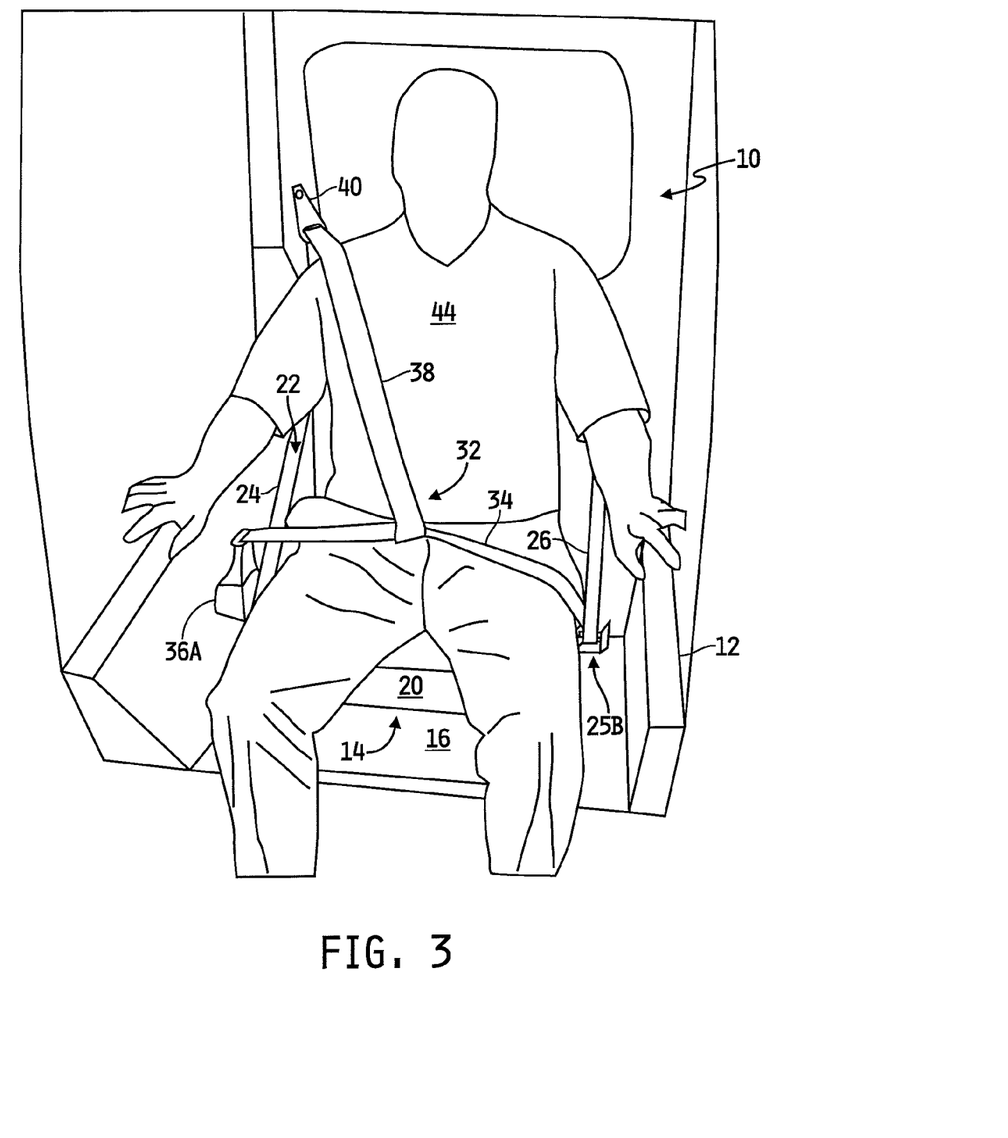
FIG. 3 is a diagram of the restraint system of FIGS. 1 and 2 shown in the occupant restraint position with an occupant in the vehicle seat.

Referring to FIGS. 1-3, diagrams of one illustrative embodiment of a restraint system 10 for a transportation vehicle 12 are shown. The vehicle 12 includes a seat 14 having a seat bottom 20 that is mounted via a seat frame (not shown) to the floor 16 of the vehicle 12, and a seat back 18 that extends upwardly away from the seat bottom 20. For purposes of this disclosure, the vehicle seat 14 may be any vehicle seat that is sized or otherwise configured to be occupied by at least one occupant. The seat 14 may be mounted in the vehicle 12, as illustrated, or may instead be a portable seat that is configured to be carried on a support surface, e.g., the floor 16 or another seat, of the vehicle 12. In any case, the vehicle seat 14 can be configured to be mounted in, or carried by, an occupant transportation vehicle 14, examples of which include, but are not limited to, conventional motor vehicles, including cars, trucks, buses, industrial machinery, special purpose vehicles such as lift trucks, skid steer loaders and the like, utility vehicles, construction vehicles and the like, conventional aircraft or watercraft, and single or multiple-track rail vehicles including trains, trams, trolleys, monorail transport systems and the like.

The restraint system 10 includes a restraint member 22 that is movably mounted to the vehicle 12. In the illustrated embodiment, the restraint member 22 includes a pair of elongated, rigid, spaced-apart legs 24 and 26 that may be formed in the shape of tubes, bars or other conventional shape. The legs 24 and 26 are illustratively formed from steel, although they may alternatively be formed from one or more other metal composites, rigid polymer or other moldable or formable material, and/or the like. In the illustrated embodiment, one end 24A of the leg 24 is pivotably mounted to a rear wall of the vehicle 12 via a conventional pin or shaft 30A, and one end 26A of the leg 26 is likewise pivotably mounted to the rear wall of the vehicle 12 via another conventional pin or shaft 30B. A cross member 28 in the form of another tube, bar or other conventional shape is affixed to and between the legs 24 and 26, e.g., at or near the ends 24A and 26A respectively, or alternatively anywhere along the lengths of the legs 24 and 26. The cross member 28 is, in the illustrated embodiment, a single rigid, elongated member that extends between the legs 24 and 26 at substantially right angles relative to the legs 24 and 26, although this disclosure contemplates alternate embodiments wherein two or more cross members are provided that may or may not cross each other, and/or wherein one or more cross members is/are affixed to the legs 24 and 26 at any desired angle(s) relative to the leg 24 and the leg 26. The legs 24 and 26 are illustratively parallel relative to each other, and remain parallel throughout movement of the restraint member 22 relative to the vehicle 12. The leg 24 defines a first length between its end 24A that is movably mounted to the vehicle 12 and an opposite free end 24B, and the leg 26 defines a second length between its end 26A that is movably mounted to the vehicle 12 and an opposite free end 26B. In the illustrated embodiment, the first and second lengths are substantially equal, although this disclosure contemplates other embodiments wherein the lengths of the legs 24 and 26 are not equal.

The restraint member 22 is configured to be movable relative to the vehicle 12 between a pre-deployed position and an occupant restraint position. The pre-deployed position is illustrated in FIG. 1. In the pre-deployed position, the restraint member 22 is positioned sufficiently above the seat back 18 so that an occupant may become seated in the seat 14 and/or may exit the seat 14 without being impeded by the restraint member 22. The occupant restraint position is illustrated most clearly in FIG. 2. In the occupant restraint position, the free ends 24B and 26B of the legs 24 and 26 respectively are below a plane defined by a seating surface of the seat bottom 20. The restraint member 22 is configured such that the legs 24 and 26 travel together along opposite sides of the seat 14 as the restraint member 22 moves relative to the vehicle 12 between the pre-deployed position and the occupant restraint position.

It will be appreciated that while the legs 24 and 26 are illustrated in FIGS. 1-3 as being implemented in the form of uncovered rigid bars, either or both of the legs 24 and 26 may alternatively be covered with padding or cushion material and/or upholstery of any desired composition, e.g., fabric, vinyl, leather, etc. It will further be appreciated that although the legs 24 and 26 are illustrated in FIGS. 1-3 as being relatively straight, rigid bars, either or both of the legs 24 and 26 may alternatively be contoured along their lengths to any desired shape, e.g., to accommodate the size and shape of the typical occupant of the seat 14. It will further be appreciated that while the restraint member 22 is illustrated throughout the FIGS. as being movably mounted to the vehicle 12 itself, e.g., to a rear wall of the vehicle 12, the restraint member 22 may alternatively be mounted to another structure that is mounted and secured to the vehicle 12. In one alternative embodiment, for example, the restraint member 22 may be mounted to the vehicle seat 14 which includes a vehicle seat frame that is mounted and secured to the vehicle 12, e.g., to the floor 16. As used herein, the phrase "movably mounted to the vehicle" is thus defined as movably mounted directly to the vehicle 12 or movably mounted to a structure that is mounted and secured to the vehicle 12.

The restraint system 10 further includes a restraint harness 32 that is mounted to, and carried by, the restraint member 22. In the illustrated embodiment, the restraint harness 32 includes a conventional retractor 36A that is mounted to the leg 24 of the restraint member 22 at or near the free end 24B thereof and another conventional retractor 36B that is mounted to the leg 26 of the restraint member at or near the free end 26B thereof. One end of a lap web 34 is mounted within the retractor 36A in a conventional manner, and an opposite end is mounted within the retractor 36B in a conventional manner. Illustratively, the retractors 36A and 36B are conventional locking retractors, although other types of conventional retractors, including non-locking retractors, may alternatively be used. In the illustrated embodiment, the retractors 36A and 36B are identical, although in other embodiments the retractors 36A and 36B need not be identical or even of the same type. For example, the retractor 36A or 36B may be a locking retractor and the other retractors 36B or 36A may be a non-locking retractor. Other combinations will occur to those skilled in the art, and any such other combinations are contemplated by this disclosure.

In an alternate embodiment, as illustrated in FIG. 2, one of the retractors, e.g., 36B, may be omitted and the free end of the lap web 34 in this embodiment may be attached to the corresponding leg. e.g., leg 26, at or near its free end, e.g., 26B. It will be understood that while further embodiments of the restraint system illustrated and described herein are shown and described with two retractors 36A and 36B as in FIG. 1, this disclosure contemplates alternate embodiments in which such illustrated restraint systems include only a single retractor 36A or 36B wherein the free end of the lap web 34 attaches to the corresponding leg at or near its end as just described. Likewise, it will be understood that while further embodiments of the restraint system illustrated and described herein are shown and described with only one retractor 36 mounted to one of the legs 24, 26, this disclosure contemplates alternate embodiments of such restraint systems that include another retractor mounted to the other of the legs 24, 26, wherein the lap web 34 extends between the retractor 36 and this additional retractor as just described.

In the embodiment illustrated in FIGS. 1-3, the restraint harness 32 further includes a shoulder web 38 having one end mounted within a conventional retractor 42 (shown only in FIG. 2) that is mounted to a support surface, e.g., a wall or frame, of the vehicle 12, and another end that is mounted either to one of the legs 24, 26, as shown in FIG. 1, or to the lap web 34, as shown in FIG. 2. In either case, the shoulder web 38 is fed through a web guide 40 that is mounted to a support surface of the vehicle 12. The web guide 40 is positioned between the retractor 42 and the free end of the shoulder web 38, and is generally positioned relative to the vehicle 12 and seat 14 so that it resides near an upwardly of a shoulder of an occupant of the seat 14. The retractor 42 is illustratively a conventional inertial locking retractor or automatic locking retractor, although this disclosure contemplates using other conventional retractors.

In the embodiment illustrated in FIG. 1, for example, the free end of the shoulder web 38 is affixed to the leg 24 at or near its free end 24B, and the web guide 40 is positioned generally above the end 26A of the leg 26. It will be understood that the free end of the shoulder web 38 may alternatively be affixed to the leg 26 at or near its free end 26B, and the web guide 40 may be positioned generally above the end 24A of the leg 24. Alternatively still, the web guide 40 in either embodiment may be positioned between the legs 24 and 26, e.g., along a back wall (not shown) of the vehicle 12.

In the embodiment illustrated in FIG. 2, as another example, the free end of the shoulder web 38 is affixed to lap web 34. It will be understood that the free end of the shoulder web 38 may, in this embodiment, be affixed to the lap web 34 at any position relative thereto, and the web guide 40 may be positioned accordingly to provide for the restraint of the torso of an occupant of the seat 14. While the retractor 24 and web guide 40 are shown in FIG. 2 as being affixed to the vehicle 12 generally along one side of the vehicle seat 14, the retractor 24 and web guide 40 may alternatively be affixed to the vehicle 12 generally along an opposite side of the seat 14.

The restraint system 10 further includes a pair of locks 25A and 25B that are mounted, e.g., rigidly secured, to a support surface of the vehicle, e.g., to the floor 16. The restraint system 10 further includes a corresponding pair of lock engaging mechanisms that are secured to or integral with the legs 24 and 26, e.g., at or near their free ends 24B and 26B respectively. The lock 25A is positioned to receive and engage the lock engaging mechanism secured to or integral with the leg 24 and the lock 25B is positioned to receive and engage the lock engaging mechanism secured to or integral with the leg 26 when the restraint system 10 is in its fully deployed position as illustrated in FIG. 2. In the illustrated embodiment, for example, the locks 25A and 25B each comprise a frame 27A, 27B defining opposing upright sidewalls with a pin or cross member 29A, 29B secured between the sidewalls. In this embodiment, the lock engaging mechanisms are illustratively provided in the form of hook members 31A and 31B, wherein the hook member 31A is mounted near the end 31B of the leg 24 and the hook member 31B is mounted near the end 26B of the leg 26. The lock 25A is positioned relative to the vehicle floor 16 to receive and engage the hook member 31A with the pin or cross member 29A, and the lock 25B is positioned relative to the vehicle floor 16 to receive and engage the hook member 31B with the pin or cross member 29B when the restraint system 10 is in its fully deployed position as illustrated in FIG. 2.

The pins or cross members 29A, 29B and/or hook members 31A, 31B may be manually actuated in order to engage and/or release the restraint member 22, and/or may be electronically actuated, some examples of which will be described in detail hereinafter. It will be understood that while the embodiment illustrated in FIG. 1 includes two locks 25A and 25B, the restraint system 10 may alternatively include more or fewer such locks. It will further be understood that while the locks 25A and 25B are illustrated in FIG. 1 as being mounted to the floor 16 of the vehicle 12 such that they engage the hook members 31A, 31B, the restraint system 10 may alternatively or additionally include one or more locks mounted or affixed to other areas of the vehicle that is/are configured to engage other portions of the leg 24, leg 26 and/or cross member 28. It will further be understood that the restraint system 10 may include one or more manual release mechanisms that are accessible by the occupant of the seat 14 to release the one or more locks, e.g., under certain safety-related conditions, so that the restraint member 22 may be moved relative to the vehicle 14 to allow the occupant to exit the seat 14. Still further, while only one illustrative embodiment of the locks 25A, 25B and lock engagement members 31A, 31B are shown in the FIGS., this disclosure contemplates providing the locks and lock engaging structures in any conventional form that may be manually, hydraulically and/or electrically actuated between locked and released positions.

Figure 5:
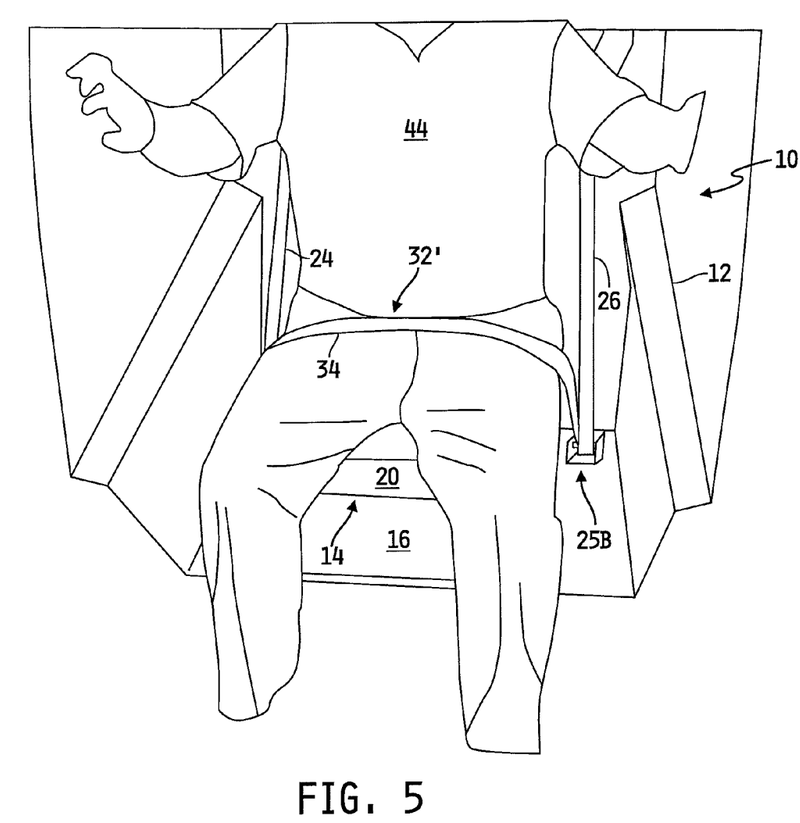
FIG. 5 is a diagram of the restraint system of FIG. 4 shown in the occupant restraint position with an occupant in the vehicle seat.
Figure 7:
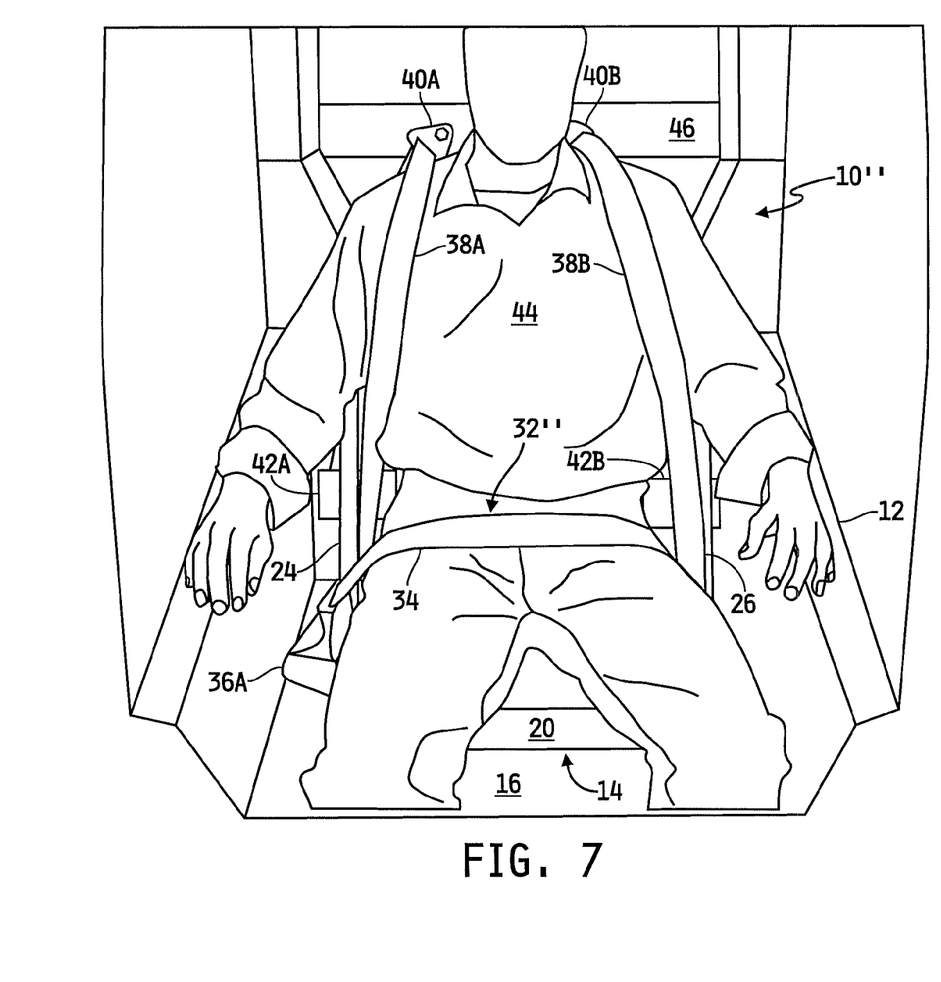
FIG. 7 is a diagram of the restraint system of FIG. 6 shown in the occupant restraint position with an occupant in the vehicle seat.
Figure 9:
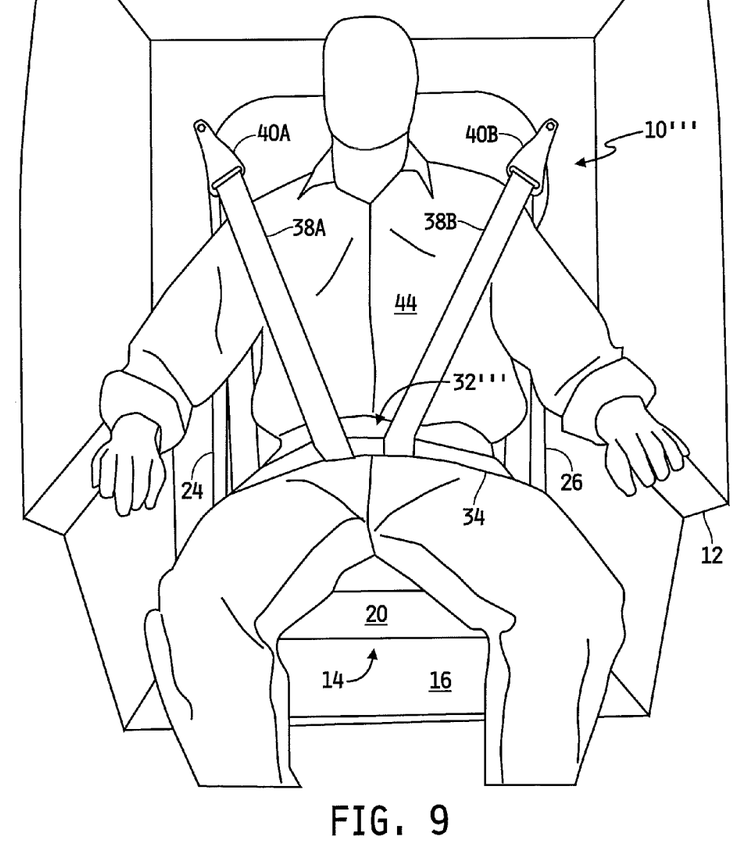
FIG. 9 is a diagram of the restraint system of FIG. 8 shown in the occupant restraint position with an occupant in the vehicle seat.

The restraint member 22 is movable relative to the vehicle 12 between the pre-deployed position illustrated in FIG. 1, and the occupant restraint position illustrated in FIGS. 2 and 3, as previously described. The restraint system 10 is configured such that the lap web 24 contacts an occupant 44 of the seat 14 as the restraint member 22 moves toward the occupant restraint position, as shown in FIG. 3. As the restraint member 22 is thereafter further advanced toward the occupant restraint position, the retractor 36 is responsive to the resistance applied to the lap web 34 by the occupant 44 to pay out additional lap web 34 so that as the restraint member 22 continues to advance toward the occupant restraint position the lap web 34 maintains contact with the occupant 44 without applying excessive force to the occupant 44. The retractor 42 likewise pays out additional shoulder web 38 as the restraint member 22 is advanced toward the occupant restraint position. When the restraint member 22 is in the occupant restraint position, the free ends 24B and 26B of the legs 24 and 26 respectively are below a plane defined by the seating surface of the seat bottom 20, such that the ends of the lap web 34 are likewise below the plane defined by the seating surface of the seat bottom 20. As shown in FIGS. 5, 7 and 9, the retractor(s) 36 is/are likewise below the plane defined by a seating surface of the seat bottom 20 when the restraint member 22 is in the occupant restraint position. The lap web 34 and the shoulder web 38 are thus automatically adjusted in length, by the retractors 36 and 42 respectively, to accommodate variously sized occupants as the restraint member 22 is advanced to the occupant restraint position. When the restraint member 22 is in the occupant restraint position, the restraint harness 32 restrains the occupant 44 in the vehicle seat 14.

Figure 4:
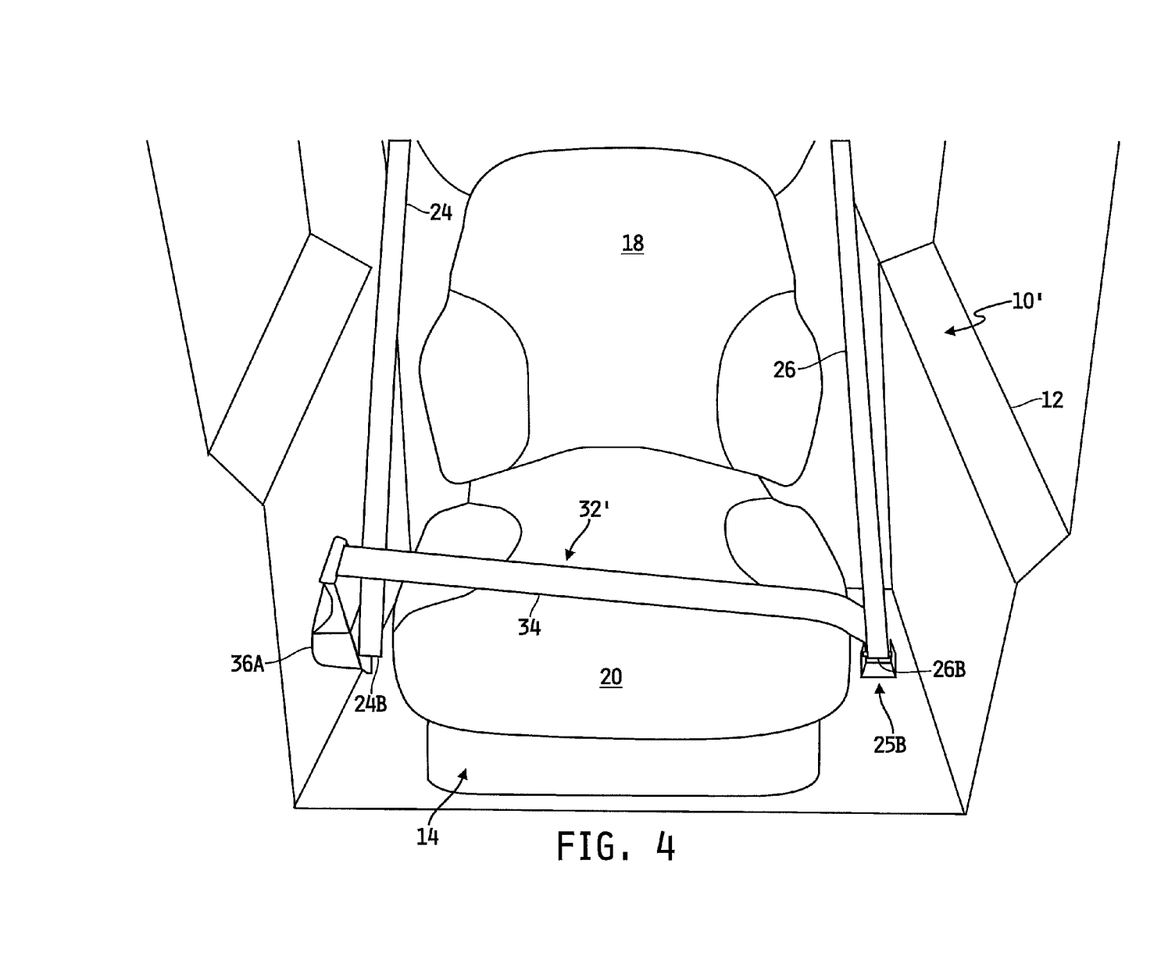
FIG. 4 is a diagram of another illustrative embodiment of a restraint system for a transportation vehicle, shown in an occupant restraint position.

Referring now to FIGS. 4 and 5, an alternate embodiment of a restraint system 10' for a transportation vehicle 12 is shown. The restraint system 10' is identical in many structural and functional respects to the restraint system 10 illustrated and described with respect to FIGS. 1-3, and like numbers are therefore used to identify like components. In the restraint system 10' of FIGS. 4 and 5, the restraint harness 32' includes only the lap web 34 and retractor 36. The shoulder web 38, web guide 40 and retractor 42 of the restraint system 10 are omitted in the restraint system 10' of FIGS. 4 and 5. Also in FIG. 4, an alternate embodiment of the restraint system locking mechanism is shown that includes only a single lock, e.g., 25B that is operable as described above. It will be understood that any embodiment of the restraint system illustrated and described herein may generally include one or more conventional locking mechanisms that is/are configured to engage the restraint member 22 and another support member, e.g., a portion of the vehicle 12 or a structure that is secured to the vehicle 12, to thereby restrain movement of the restraint member 22 relative to the vehicle 12.

Figure 6:
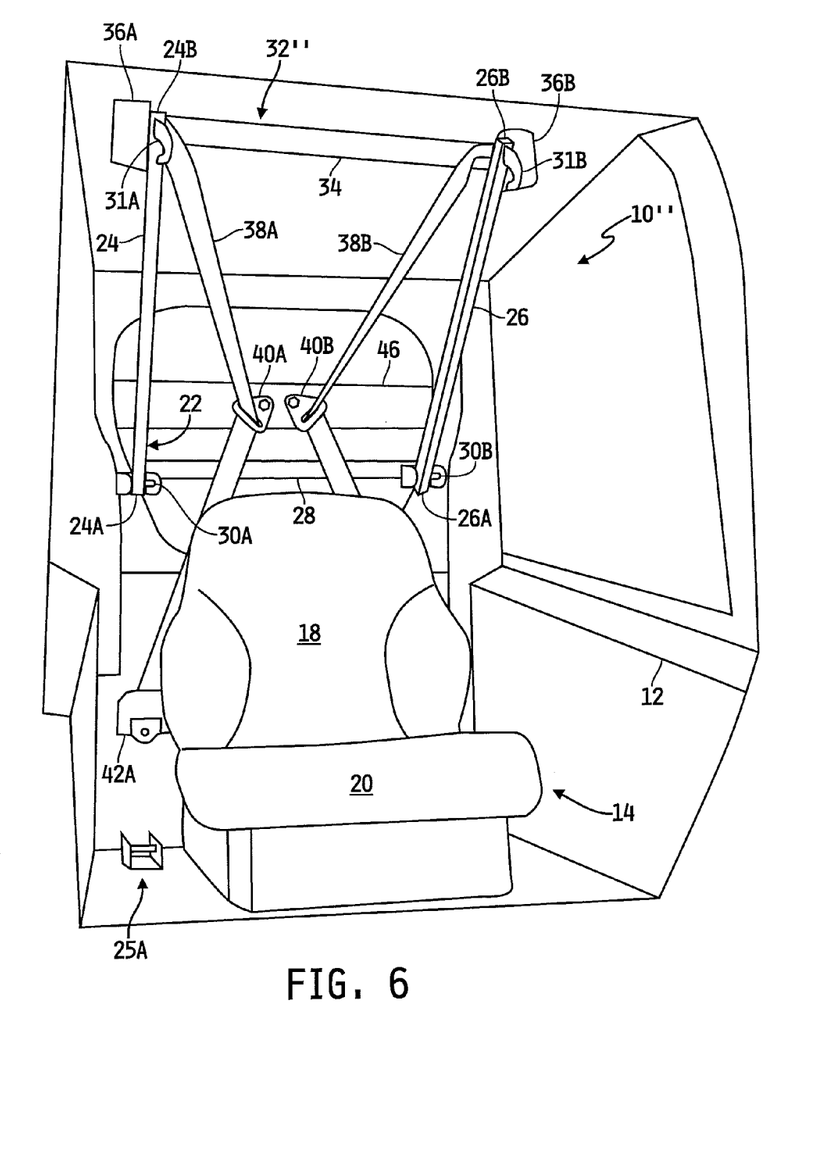
FIG. 6 is a diagram of yet another illustrative embodiment of a restraint system for a transportation vehicle, shown in a pre-deployed position.

Referring now to FIGS. 6 and 7, another alternate embodiment of a restraint system 10" for a transportation vehicle 12 is shown. The restraint system 10" is identical in many structural and functional respects to the restraint system 10 illustrated and described with respect to FIGS. 1-3, and like numbers are therefore used to identify like components. The restraint system 10" of FIGS. 6 and 7 differs from the restraint system 10 of FIGS. 1-3 in that the restraint harness 32" includes two shoulder webs 38A and 38B, two corresponding web guides 40A and 40B and two corresponding retractors 42A and 42B. In the illustrated embodiment, one end of the shoulder web 38A is mounted within a conventional retractor 42A that is mounted to a support surface of the vehicle 12 adjacent to one side of the vehicle seat 14. The opposite end of the shoulder web 38A is attached to the leg 24 of the restraint member 22 at or near its free end 24B. One end of the shoulder web 38B is likewise mounted within a conventional retractor 42B that is mounted to a support surface of the vehicle 12 adjacent to the opposite side of the vehicle seat 14. The opposite end of the shoulder web 38B is attached to the leg 26 of the restraint member 22 at or near its free end 26B. The web guides 40A and 40B are both mounted or attached to a support surface of the vehicle 12, e.g., a rear wall, such that the web guides 40A and 40B are positioned generally between the legs 24 and 26 of the restraint member 22. In the illustrated embodiment, the web retractors 42A and 42B are both inertial locking retractors or automatic locking retractors, although this disclosure contemplates using other conventional retractors. Operationally, the restraint system 10" is substantially identical to that of the restraint system 10 described in detail hereinabove with respect to FIGS. 1-3, with the exception that the shoulder webs 38A and 38B are configured to extend over opposite shoulders of the occupant 44 of the seat 14 as shown in FIG. 7.

Figure 8:
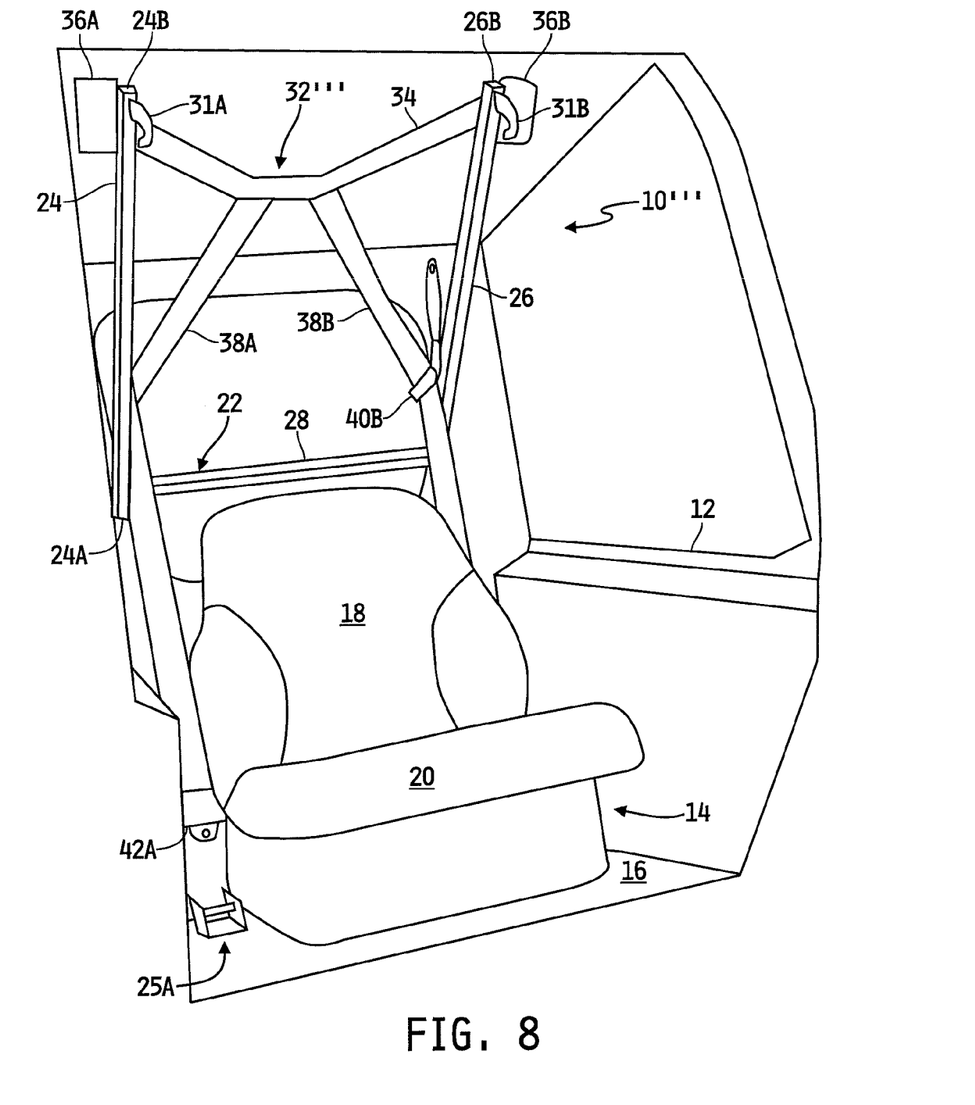
FIG. 8 is a diagram of still another illustrative embodiment of a restraint system for a transportation vehicle, shown in a pre-deployed position.

Referring now to FIGS. 8 and 9, yet another alternate embodiment of a restraint system 10''' for an occupant transportation vehicle 12 are shown. The restraint system 10''' is identical in many structural and functional respects to the restraint systems 10 illustrated and described with respect to FIGS. 1-3 and 10" illustrated and described with respect to FIGS. 6-7. Like numbers are therefore used to identify like components. The restraint system 10''' of FIGS. 8 and 9 differs from the restraint system 10 of FIGS. 1-3, and is similar to the restraint system 10" of FIGS. 6 and 7, in that the restraint harness 32''' includes two shoulder webs 38A and 38B, two corresponding web guides 40A and 40B and two corresponding retractors 42A and 42B. In the illustrated embodiment, one end of the shoulder web 38A is mounted within a conventional retractor 42A that is mounted to a support surface of the vehicle 12 adjacent to one side of the vehicle seat 14. Unlike the restraint system 10" illustrated in FIGS. 6-7, however, the opposite end of the shoulder web 38A is attached to the lap web 34. One end of the shoulder web 38B is likewise mounted within a conventional retractor 42B that is mounted to a support surface of the vehicle 12 adjacent to the opposite side of the vehicle seat 14. Again, unlike the restraint system 10" illustrated in FIGS. 6-7, the opposite end of the shoulder web 38B is attached to the lap web 34. The web guides 40A and 40B are both mounted or attached to a support surface of the vehicle 12, e.g., a rear wall, such that the web guides 40A and 40B are positioned generally outside of the legs 24 and 26 of the restraint member 22. In the illustrated embodiment, the web retractors 42A and 42B are both inertial locking retractors or automatic locking retractors, although this disclosure contemplates using other conventional retractors. Operationally, the restraint system 10''' is substantially identical to that of the restraint system 10 described in detail hereinabove with respect to FIGS. 1-3, with the exception that the shoulder webs 38A and 38B are configured to extend over opposite shoulders of the occupant 44 of the seat 14 as shown in FIG. 9.

Figure 10:
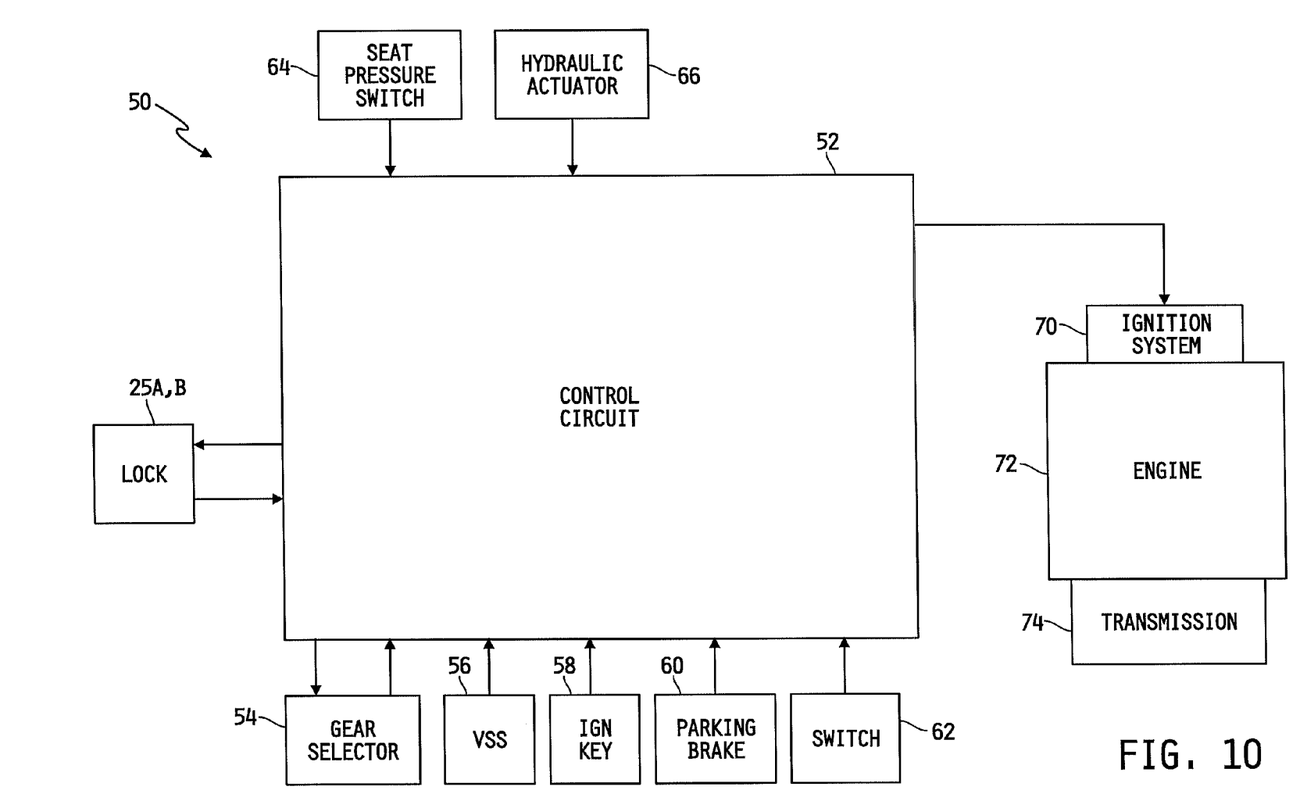
FIG. 10 is a block diagram of one embodiment of a control system for controlling operation of the restraint system lock(s) and/or for controlling operation of the vehicle based on the state of the restraint system lock(s).

Referring now to FIG. 10, one illustrative embodiment of a control system 50 for controlling operation of the restraint system lock(s) 25A, 25B and/or for controlling operation of the vehicle 12 based on the state of the restraint system lock(s) 25A, 25B. In the illustrated embodiment, the control system 50 includes a conventional control circuit 52. The control circuit 52 includes a memory having stored therein instructions that are executable by the control circuit to control operation of the restraint system lock(s) 25A, 25B and/or lock engaging member(s) 31A, 31B, and/or to control operation of certain operational features of the vehicle 12 based on the state of the lock(s) 25A, 25B and/or lock engaging member(s) 31A, 31B.

In one embodiment, for example, the control circuit 52 is configured to receive inputs from sensors and/or switches associated with any one or more of, but not limited to, a transmission gear selector 54, a vehicle speed sensor 56, an ignition key 58, a parking brake 60, a manually activated switch 62 and a seat pressure switch 64. At least one of the locks 25A, 25B and/or lock engaging members 31A, 31B includes at least one actuator that is responsive to a first control signal to control the lock 25A, 25B and/or lock engaging member 31A, 31B to a locked position in which the restraint member 22 is secured to the vehicle 12 as described hereinabove, and that is responsive to a second control signal to control the lock 25A, 25B and/or lock engaging member 31A, 31B to an unlocked position in which the restraint member 22 may be moved relative to the vehicle 12. In this embodiment, the control circuit 52 is operable, pursuant to at least one set of instructions stored in the memory, to produce the first and second control signals based on a signal received from at least one of the transmission gear selector 54, the vehicle speed sensor 56, the ignition key 58, the parking brake 60, the manually activated switch 62 and the seat pressure switch 64. For example, the control circuit 52 may be operable, pursuant to at least one set of instructions stored in the memory, to produce the first control signal, and thereby control the lock(s) 25A, 25B and/or lock engaging member(s) 31A, 31B to a locked position, when the gear selector is moved from a "park" position to any other position. The control circuit 52 may further be operable, pursuant to at least one set of instructions stored in the memory, to produce the second control signal, and thereby control the lock(s) 25A, 25B and/or lock engaging member(s) 31A, 31B to a locked position, when the gear selector is moved to the "park" position from any other position. Alternatively or additionally, the control circuit 52 may be operable, pursuant to at least one set of instructions stored in the memory, to produce the first control signal, and thereby control the lock(s) 25A, 25B and/or lock engaging member(s) 31A, 31B to a locked position, when the vehicle speed sensor indicates that the velocity of the vehicle in a forward or reverse direction is greater than a vehicle speed threshold. The control circuit 52 may further be operable, pursuant to at least one set of instructions stored in the memory, to produce the second control signal, and thereby control the lock(s) 25A, 25B and/or lock engaging member(s) 31A, 31B to a locked position, when the vehicle speed sensor indicates that the velocity of the vehicle in a forward or reverse direction is less than the vehicle speed threshold or is less than a different vehicle speed threshold that is less than the original vehicle speed threshold. Alternatively or additionally, the control circuit 52 may be operable, pursuant to at least one set of instructions stored in the memory, to produce the first control signal, and thereby control the lock(s) 25A, 25B and/or lock engaging member(s) 31A, 31B to a locked position, when the ignition key is moved to a "start" position. The control circuit 52 may further be operable, pursuant to at least one set of instructions stored in the memory, to produce the second control signal, and thereby control the lock(s) 25A, 25B and/or lock engaging member(s) 31A, 31B to a locked position, when the ignition key 58 is moved to a stop position. Alternatively or additionally, the control circuit 52 may be operable, pursuant to at least one set of instructions stored in the memory, to produce the first control signal, and thereby control the lock(s) 25A, 25B and/or lock engaging member(s) 31A, 31B to a locked position, when the parking brake 60 is released. The control circuit 52 may further be operable, pursuant to at least one set of instructions stored in the memory, to produce the second control signal, and thereby control the lock(s) 25A, 25B and/or lock engaging member(s) 31A, 31B to a locked position, when the parking brake 60 is engaged. Alternatively or additionally, the control circuit 52 may be operable, pursuant to at least one set of instructions stored in the memory, to produce the first control signal, and thereby control the lock(s) 25A, 25B and/or lock engaging member(s) 31A, 31B to a locked position, when the manually activated switch 62 is in a first position. The control circuit 52 may further be operable, pursuant to at least one set of instructions stored in the memory, to produce the second control signal, and thereby control the lock(s) 25A, 25B and/or lock engaging member(s) 31A, 31B to a locked position, when the manually activated switch is in a second position. Alternatively or additionally, the control circuit 52 may be operable, pursuant to at least one set of instructions stored in the memory, to produce the first control signal, and thereby control the lock(s) 25A, 25B and/or lock engaging member(s) 31A, 31B to a locked position, when the seat pressure switch 64 produces a first signal indicative of an occupant seated in the seat 14. The control circuit 52 may further be operable, pursuant to at least one set of instructions stored in the memory, to produce the second control signal, and thereby control the lock(s) 25A, 25B and/or lock engaging member(s) 31A, 31B to a locked position, when the seat pressure switch 64 produces a second signal indicative of the seat 14 being unoccupied. Those skilled in the art will recognize other vehicle-related events that may be used to trigger the locking and/or unlocking of the restraint system lock(s) 25A, 25B and/or lock engaging member(s) 31A, 31B, and any such other vehicle-related events are contemplated by this disclosure.

In an alternative embodiment, or in addition to the features of the embodiment just described, at least one of the locks 25A, 25B and/or lock engaging member(s) 31A, 31B includes at least one sensor or switch that produces a first signal when the lock(s) 25A, 25B and/or lock engaging member(s) 31A, 31B is/are in a locked position in which the restraint member 22 is secured to the vehicle 12 as described hereinabove, and that produces a second signal when the lock(s) 25A, 25B and/or lock engaging member(s) 31A, 31B is/are in an unlocked position in which the restraint member 22 may be moved relative to the vehicle 12. In this embodiment, the control circuit 52 is configured to receive as inputs the signals produced by the at least one sensor or switch associated with the lock(s) 25A, 25B and/or lock engaging member(s) 31A, 31B. Further in this embodiment, the gear selector 54 is responsive to a first control signal inhibit or disable movement thereof, and to a second control signal to allow movement thereof. Alternatively or additionally, a hydraulic actuator 66, e.g., that controls the lifting of one or more lift mechanisms associated with the vehicle 12, is responsive to the first control signal to inhibit or disable operation thereof, and to the second control signal to allow operation thereof. Alternatively or additionally, an ignition system 70 of an engine 72, e.g., an internal combustion engine, carried by the vehicle 12 and coupled to a transmission 74, is responsive to the first control signal to inhibit or disable operation thereof, and to the second control signal to allow operation thereof. In this embodiment, the control circuit 52 is operable, pursuant to at least one set of instructions stored in the memory, to produce the first and second control signals based on the signal received from the at least one lock 25A, 25B and/or lock engaging member 31A, 31B. For example, the control circuit 52 may be operable, pursuant to at least one set of instructions stored in the memory, to produce the first control signal to thereby inhibit or disable operation of the transmission gear selector 54 and/or of the hydraulic actuator 66 and/or of the ignition system 70 if the at least one lock 25A, 25B and/or lock engaging member 31A, 31B is producing the second signal, thereby indicating that the lock(s) 25A, 25B and/or lock engaging member(s) 31A, 31B is/are in an unlocked position in which the restraint member 22 may be moved relative to the vehicle 12. The control circuit 52 may further be operable, pursuant to at least one set of instructions stored in the memory, to produce the second control signal to thereby allow or enable operation of the transmission gear selector 54 and/or of the hydraulic actuator 66 and/or of the ignition system 70 if the at least one lock 25A, 25B and/or lock engaging member 31A, 31B is producing the first signal, thus indicating that the lock(s) 25A, 25B and/or lock engaging member(s) 31A, 31B is/are in an locked position in which the restraint member 22 is secured to the vehicle 12. Those skilled in the art will recognize other vehicle-related events that may be inhibited (disabled) or allowed (enabled) based on the status of the restraint system lock(s) 25A, 25B and/or lock engaging member(s) 31A, 31B, and any such other vehicle-related events are contemplated by this disclosure.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, while each of the embodiments of the restraint system 10, 10', 10'' and 10''' illustrated and described herein are disclosed as including one or more conventional retractors, this disclosure contemplates alternate embodiments of each of the restraint systems 10, 10', 10'' and 10''' in which one or more of the retractors is/are replaced with a conventional web length adjusting device. Such web length adjusting devices are generally understood to allow for the manual lengthening and shortening of lap and/or shoulder web(s), and may therefore be used in place of any one or more of the retractors.

What is claimed is:

1. A restraint system for an occupant transportation vehicle, comprising:
   a restraint member movably mounted to the vehicle, the restraint member having a first leg and a second leg spaced apart from the first leg, the first and second legs configured to travel together along opposite sides of a seat carried by the vehicle as the restraint member moves relative to the vehicle,
   a restraint harness comprising a first retractor mounted to one of the first and second legs of the restraint member, and a lap web having one end mounted within the first retractor and an opposite end mounted to the other of the first and second legs, the lap web configured to restrain an occupant of the seat when the restraint member is moved to an occupant restraint position, and
   at least one lock configured to secure the restraint member to the vehicle when the restraint member is in the occupant restraint position.

2. The restraint system of claim 1 wherein the restraint harness further comprises a second retractor mounted to the other of the first and second legs of the restraint member,
   and wherein the other end of the lap web is mounted within the second retractor.

3. The restraint system of claim 2 further comprising a third retractor mounted within the vehicle adjacent to one side of the seat,
   and wherein the restraint harness further comprises a first shoulder web having one end mounted within the third retractor and an opposite end mounted to one of the first and second legs, the first shoulder web configured to extend over one shoulder of the occupant of the seat, and to restrain the occupant of the seat, when the restraint member is in the occupant restraint position.

4. The restraint system of claim 3 further comprising a web guide mounted within the vehicle, wherein the first shoulder web extends through the web guide between the third retractor and the opposite end of the first shoulder web.

5. The restraint system of claim 3 further comprising a fourth retractor mounted within the vehicle adjacent to an opposite side of the seat,
   and wherein the restraint harness further comprises a second shoulder web having one end mounted within the fourth retractor and an opposite end mounted to the other of the first and second legs, the second shoulder web configured to extend over an opposite shoulder of the occupant of the seat, and to restrain the occupant of the seat, when the restraint member is in the occupant restraint position.

6. The restraint system of claim 5 further comprising first and second web guides mounted within the vehicle, wherein the first shoulder web extends through the first web guide between the third retractor and the opposite end of the first shoulder web, and the second shoulder web extends through the second web guide between the fourth retractor and the opposite end of the second shoulder web.

7. The restraint system of claim 2 further comprising a third retractor mounted within the vehicle adjacent to one side of the seat,
   and wherein the restraint harness further comprises a first shoulder web having one end mounted within the third retractor and an opposite end affixed to the lap web between the first and second legs, the first shoulder web configured to extend over one shoulder of the occupant of the seat, and to restrain the occupant of the seat, when the restraint member is in the occupant restraint position.

8. The restraint system of claim 7 further comprising a web guide mounted within the vehicle,
   wherein the first shoulder web extends through the web guide between the third retractor and the opposite end of the first shoulder web.

9. The restraint system of claim 7 further comprising a fourth retractor mounted within the vehicle adjacent to an opposite side of the seat,
   and wherein the restraint harness further comprises a second shoulder web having one end mounted within the fourth retractor and an opposite end affixed to the lap web between the first and second legs, the second shoulder web configured to extend over an opposite shoulder of the occupant of the seat, and to restrain the occupant of the seat, when the restraint member is in the occupant restraint position.

10. The restraint system of claim 9 further comprising first and second web guides mounted within the vehicle, wherein the first shoulder web extends through the first web guide between the third retractor and the opposite end of the first shoulder web, and the second shoulder web extends through the second web guide between the fourth retractor and the opposite end of the second shoulder web.

11. The restraint system of claim 1 wherein the restraint member is pivotably mounted to the vehicle.

12. The restraint system of claim 1 wherein the restraint member comprises a cross member having one end affixed to the first leg and an opposite end affixed to the second leg.

13. The restraint system of claim 12 wherein the first and second legs each have one end pivotably mounted to the vehicle and an opposite end,
   and wherein the cross member is affixed to the first and second legs near the one ends thereof.

14. The restraint system of claim 1 wherein the vehicle seat comprises a seat bottom mounted to the vehicle and a seat back extending upwardly away from the seat bottom,
   and wherein the restraint member is movable relative to the vehicle between a pre-deployed position above the seat back such that an occupant may be seated in the seat without being impeded by the restraint member, and the occupant restraint position in which the first retractor is below a plane defined by a seating surface of the seat bottom such that the lap web contacts the occupant seated in the seat as the restraint member is being moved from the pre-deployed position to the occupant restraint position, and such that the first retractor pays out additional lap web after the lap web contacts the occupant when moving the restraint member to the occupant restraint position.

15. The restraint system of claim 1 wherein the at least one lock comprises at least one actuator that is responsive to a control signal to control the at least one lock to a locked position in which the restraint member is secured to the vehicle.

16. The restraint system of claim 15 further comprising a control circuit configured to produce the control signal based on a signal received from at least one of a manually activated switch, a seat pressure switch, a parking brake, an ignition system of the vehicle, a vehicle speed sensor and a transmission gear selector.

17. The restraint system of claim 2 wherein one end of the first leg is pivotably mounted to the vehicle and the first retractor is mounted at or near an opposite end of the first leg,
   and wherein one end of the second leg is pivotably mounted to the vehicle and the second retractor is mounted at or near an opposite end of the second leg.

18. A restraint system for an occupant transportation vehicle, comprising:
   a restraint member movably mounted to the vehicle, the restraint member having a first leg and a second leg spaced apart from the first leg, the first and second legs configured to travel together along opposite sides of a seat carried by the vehicle as the restraint member moves relative to the vehicle,
   a restraint harness comprising a first retractor mounted to one of the first and second legs of the restraint member, and a lap web having one end mounted within the first retractor and an opposite end mounted to the other of the first and second legs, the lap web configured to restrain an occupant of the seat when the restraint member is moved to an occupant restraint position,
   at least one lock configured to secure the restraint member to the vehicle when the restraint member is in the occupant restraint position, and
   a second retractor mounted within the vehicle adjacent to one side of the seat, wherein the restraint harness further comprises a first shoulder web having one end mounted within the second retractor and an opposite end mounted to one of the first and second legs, the first shoulder web configured to extend over one shoulder of the occupant of the seat, and to restrain the occupant of the seat, when the restraint member is in the occupant restraint position.

* * * * *